United States Patent
Goult et al.

(10) Patent No.: US 11,266,973 B2
(45) Date of Patent: Mar. 8, 2022

(54) ARRANGEMENT FOR CONTINUOUS PRODUCTION OF POLYMER

(71) Applicant: KEMIRA OYJ, Helsinki (FI)

(72) Inventors: David Goult, Bradford (GB); Simon Naylor, Bradford (GB); Dave Tuff, Bradford (GB)

(73) Assignee: KEMIRA OYJ, Helsinki (FI)

( * ) Notice: Subject to any disclaimer, the term of this patent is extended or adjusted under 35 U.S.C. 154(b) by 519 days.

(21) Appl. No.: 16/319,493

(22) PCT Filed: Aug. 8, 2017

(86) PCT No.: PCT/FI2017/050565
§ 371 (c)(1),
(2) Date: Jan. 22, 2019

(87) PCT Pub. No.: WO2018/029398
PCT Pub. Date: Feb. 15, 2018

(65) Prior Publication Data
US 2021/0283571 A1    Sep. 16, 2021

(30) Foreign Application Priority Data

Aug. 8, 2016   (FI) ..................................... 20165607

(51) Int. Cl.
*B01J 19/22*        (2006.01)
(52) U.S. Cl.
CPC ...... *B01J 19/22* (2013.01); *B01J 2219/00033* (2013.01); *B01J 2219/00054* (2013.01);
(Continued)
(58) Field of Classification Search
CPC .............. B01J 19/22; B01J 2219/00033; B01J 2219/00054; B01J 2219/00736
See application file for complete search history.

(56) References Cited

U.S. PATENT DOCUMENTS

| | | |
|---|---|---|
| 4,389,357 A | 6/1983 | Chu et al. |
| 4,857,610 A | 8/1989 | Chmelir et al. |
| (Continued) | | |

FOREIGN PATENT DOCUMENTS

| | | |
|---|---|---|
| EP | 0228638 A1 | 7/1987 |
| EP | 0955086 A2 | 11/1999 |
| (Continued) | | |

OTHER PUBLICATIONS

Finnish Patent and Registration Office, Search Report of Finnish Application No. 20165607, dated Mar. 2, 2017.

*Primary Examiner* — Lessanework Seifu
(74) *Attorney, Agent, or Firm* — Robin L. Teskin; Baker, Donelson, Bearman, Caldwell & Berkowitz PC

(57) ABSTRACT

The invention relates to an arrangement for continuous production of polymer including a polymerisation reactor. The reactor includes a first pulley and a second pulley arranged at a distance from each other, which distance, defining a longitudinal first direction, and a flexible endless belt having a first edge section and a second edge section, which belt, is arranged to travel over the first pulley and the second pulley as a flat belt. The reactor further includes a supporting structure, which is arranged to support the flexible endless belt between the first pulley and the second pulley, whereby the supporting structure is arranged to form the flexible endless belt into a trough section by deviating the first edge section and the second edge section of the flexible endless belt away from the first direction. The trough section has a width-to-height ratio <1.2.

16 Claims, 2 Drawing Sheets

Figure 1:
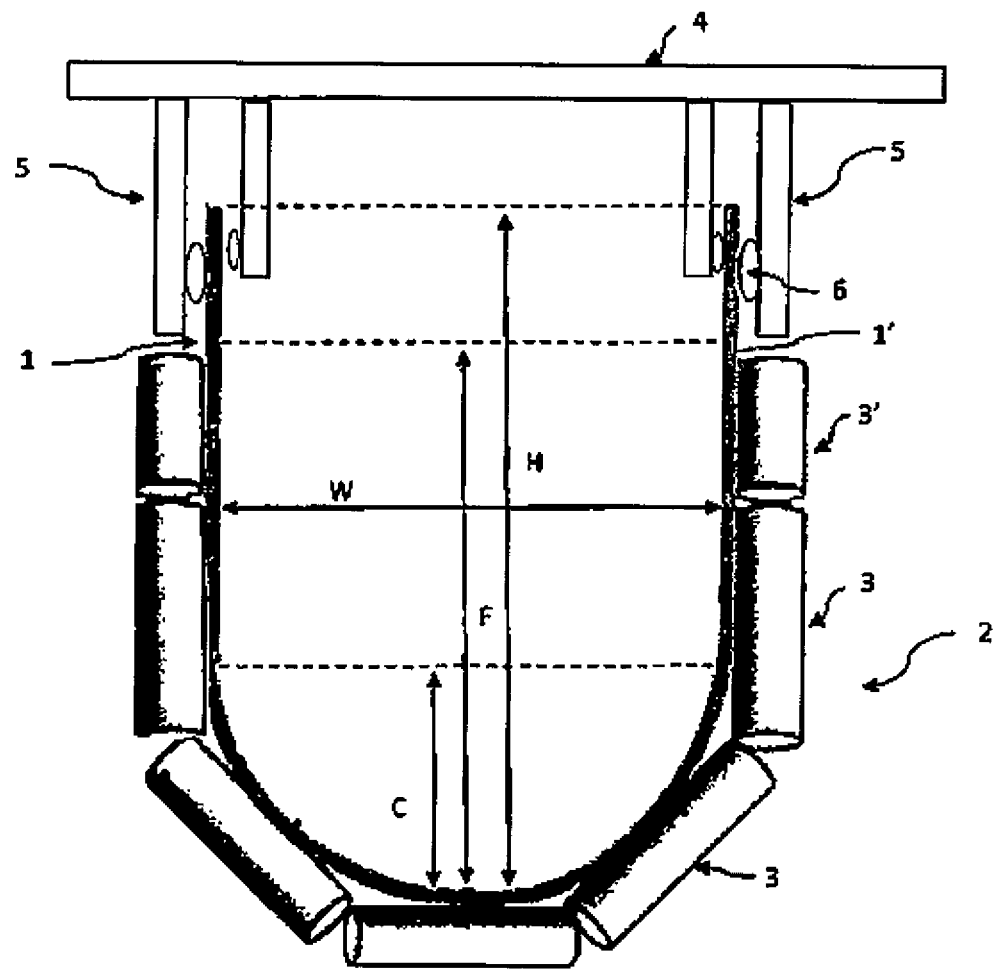

(52) U.S. Cl.
CPC ............... *B01J 2219/00736* (2013.01); *B01J 2219/00761* (2013.01)

(56) References Cited

U.S. PATENT DOCUMENTS

| | | |
|---|---|---|
| 4,893,999 A | 1/1990 | Chmelir et al. |
| 2006/0167198 A1 | 7/2006 | Sasabe et al. |
| 2014/0323663 A1 | 10/2014 | Plöchinger et al. |

FOREIGN PATENT DOCUMENTS

| | | |
|---|---|---|
| WO | 2008086974 A1 | 7/2008 |
| WO | 2015163513 A1 | 10/2015 |
| WO | 2015163521 A1 | 10/2015 |

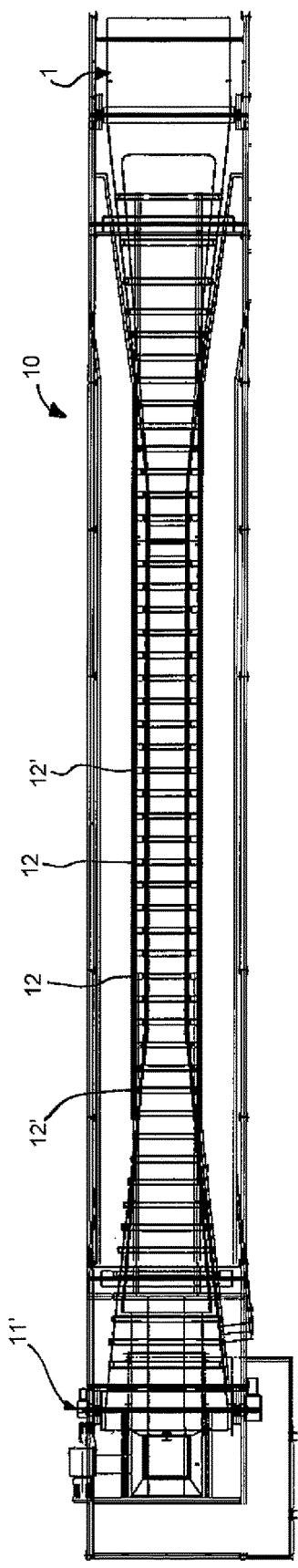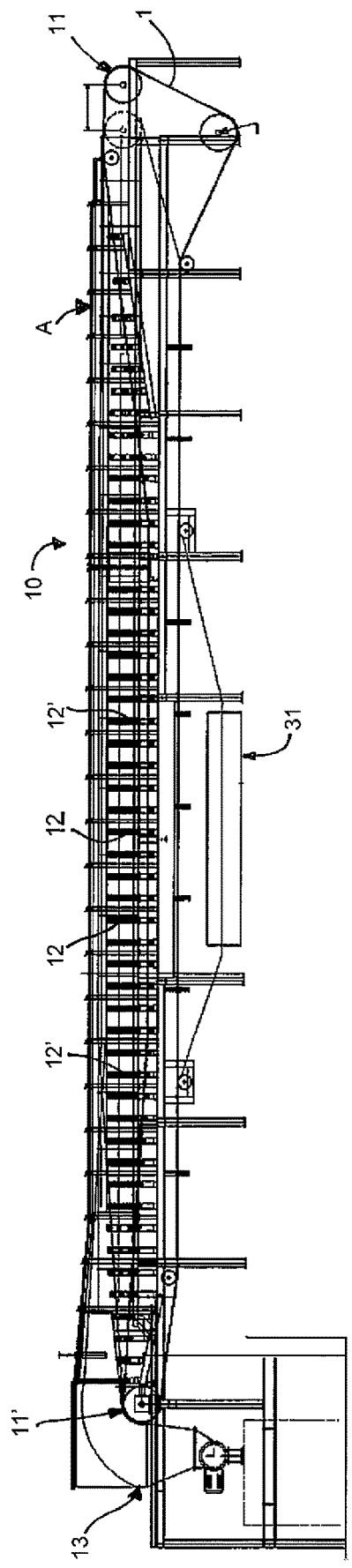
FIGURE 2
FIGURE 3

ARRANGEMENT FOR CONTINUOUS PRODUCTION OF POLYMER

PRIORITY

This application is a U.S. national application of the international application number PCT/FI2017/050565 filed on Aug. 8, 2017 and claiming priority of Finnish national application 20165607 filed on Aug. 8, 2016 the contents of all of which are incorporated herein by reference.

The present invention relates to an arrangement for continuous production of polymer according to the preambles of the independent claims presented below.

For example acrylic polymers are prepared by using continuous polymerisation process, where a moving conveyor belt forms a part of a polymerisation reactor. Starting monomer(s) in solution form are continuously fed onto the moving conveyor belt at the first end of the conveyor, i.e. reactor, and the polymerisation process proceeds on the conveyor belt, while the polymerising mass is moving towards the second end of the conveyor, i.e. reactor. The obtained polymer in gel form is removed from the conveyor belt at the second end of the conveyor.

The moving conveyor belt, which functions as the polymerisation reactor, usually comprises a supporting structure, which turns the edge sections of the flexible conveyor belt upwards between the first and second end of the conveyor. Thus the conveyor belt has a form of a trough between the ends of the conveyor while the polymerisation reaction is proceeding. The trough form of the conveyor belt retains the monomers and incompletely polymerised mass on the belt.

There is a constant need to improve the polymerisation conditions and the production rate in the polymerisation process.

An object of this invention is to minimise or possibly even eliminate the disadvantages existing in the prior art.

Another object of the present invention is an arrangement, which is able to provide an increased polymerisation capacity as well as a high residence time, while minimising the space needed for the arrangement.

A further object of the present invention is to provide an arrangement, which is easy and simple to maintain.

In order to achieve among others the objects presented above, the invention is characterised by what is presented in the characterising parts of the enclosed independent claims.

Some preferable embodiments of the invention will be described in the dependent claims.

The embodiments mentioned in this text relate, where applicable, to all aspects of the invention, even if this is not always separately mentioned.

Typical arrangement according to the present invention for continuous production of polymer comprises a polymerisation reactor, which comprises
- a first pulley and a second pulley arranged at a distance from each other, which distance defines a longitudinal first direction,
- a flexible endless belt having a first edge section and a second edge section, which belt is arranged to travel over the first pulley and the second pulley as a flat belt, and
- a supporting structure, which is arranged to support the flexible endless belt between the first pulley and the second pulley, whereby the supporting structure is arranged to form the flexible endless belt into a trough section by deviating the first edge section and the second edge section of the flexible endless belt away from the first direction, the trough section having a trough length parallel with the longitudinal first direction, as well as a trough height and a trough width, which are perpendicular with the trough length and with each other, wherein the trough section has a width-to-height ratio <1.2, for at least 5% of the distance between the first pulley and the second pulley.

Now it has been surprisingly found that when the width-to-height ratio of the trough section is <1.2, the residence time in the polymerisation process can be increased without any significant loss in production capacity. Alternatively, if the residence time is kept unchanged, it is possible to produce much larger amounts of polymer. Furthermore, for same amount of the produced polymer the surface area of the polymer which is in contact with the surrounding atmosphere during the polymerisation process is reduced. It is speculated, without wishing to be bound by theory, that this as well as the increased residence time may also have a positive effect on the properties of the produced polymer. For example, it has been observed that the produced polymer has a low content of insoluble material, which is beneficial when the polymer is used, e.g. in sludge and/or wastewater treatment.

The arrangement of the present invention comprises an elongated polymerisation reactor, which has a first end and a second end. The reactor comprises a flexible endless conveyor belt which is arranged to travel over at least a first pulley located in the first end of the polymerisation reactor and a second pulley located in the second end of the polymerisation reactor. The pulleys have a turning central axis, around which they rotate. The turning axes of the pulleys are horizontal, and parallel with each other and the width of the belt.

The first pulley and a second pulley are arranged at a distance from each other, which distance also defines the longitudinal first direction. The distance between the first and second pulley also define the length of the polymerisation reactor, which is available for polymerisation reaction. The distance between the first and the second pulley may be 10-50 m, preferably 20-40 m. At least one of the pulleys is driven, or both or all pulleys may be driven, for example with the aid of suitable motor means. The location of at least one pulley, or the location of the first pulley and the second pulley, may be configured to be adjustable in the first direction, which means that the length of the polymerisation reactor may be adjusted if needed. In general, the turning axes of the pulleys are perpendicular to the first longitudinal direction.

The flexible endless belt has a first and a second large surface and it travels over at least the first and the second pulley as a flat horizontal belt, whereby the first large surface of the belt is essentially in contact with the surface of the pulleys when the belt is turning around them. The flat endless belt, when arranged over the first and the second pulley, may be considered to define an imaginary first plane. The monomer(s) to be polymerised are introduced on the second surface of the belt at the first end of the polymerisation reactor, and the reaction mixture is in immediate contact with the second surface of the belt while travelling from the first end of the reactor to the second end of the reactor. The flexible endless belt may be made of any suitable material having the required tensile strength, flexibility, fatigue strength, good deformability and chemical resistance to the used polymerisation constituents. The endless belt may be manufactured from a single material or it may be a multi-layered material. Suitable materials may be e.g. natural or synthetic rubbers, polyethylene, polypropylene, polyisobutylene, polyester resins, epoxy resins, polyamides, halogenated polyolefins, such as polyvinyl chloride or polytetrafluorethylene, or any combination of these. The belt may also comprise strengthening fibrous material, such as natural or synthetic textile fibres, glass fibres or metal fibres. The fibre orientation of the strengthening fibrous material may be parallel or perpendicular to the first longitudinal direction.

The flexible endless belt has a first edge and a second edge, the edges being parallel with the first longitudinal direction. The width of the belt, measured from the belt as flat, from the first edge of the belt to the second edge of the belt, may be 0.9-4.5 m, preferably 1.8-3.7 m.

The flexible endless belt has also a first edge section and a second edge section. An edge section is here understood as a section that extends from the first edge and/or second edge of the belt towards the longitudinal centre line of the belt. The width of the edge section is less than 50%, preferably less than 40% of the total width of the belt in flat state. Preferably the first edge section and the second edge section are of identical width. The edge sections of the belt are at least partially supported out of the horizontal imaginary first plane, i.e. upwards, and form a trough section, which is described later in more detail.

The arrangement further comprises a supporting structure, which is arranged to support the flexible endless belt between the first pulley and the second pulley when the belt is travelling from the first end of the polymerisation reactor towards the second end of the polymerisation reactor. The supporting structure is in contact with the first large surface of the flexible endless belt and causes the first edge section and the second edge section of the belt to deviate away from the first longitudinal direction and from the horizontal imaginary first plane defined by the flat state of the belt. In other words, the supporting structure direct or supports the edge sections upwards, and the flexible belt is transformed into a trough-like shape.

The supporting structure is thus arranged to form the flexible belt into a trough section, which may be U- or V-shaped. The trough section has a trough length, which is parallel with the longitudinal first direction, as well as a trough height and a trough width, which are perpendicular with the trough length and with each other. The trough length is less than the distance between the first and second pulley. The trough height as well as the trough width varies gradually along the first longitudinal direction, a maximum trough height and minimum trough width existing between the first end and second end of the polymerisation reactor. The trough height increases from the first end of the polymerisation reactor, where the flat belt travels over the first pulley, to the maximum trough height. The trough height reduces then towards the second end of the polymerisation reactor, where the flat belt travels over the second pulley. Similarly the trough width decreases to the minimum width during the transition of the flexible belt from flat shape to a trough-like shape and the return back to a flat shape.

According to one preferable embodiment of the invention the trough section has the width-to-height ratio in the range of 0.5-1.2, preferably 0.6-1.1, more preferably 0.65-1. The width of the trough section is measured in the upper part of the trough section, where the distance between the first and second edge section of the belt deviating from the horizontal plane is constant. In case of the V-shaped trough the trough width is the distance between belt edges. The trough height is measured from the level of the belt edges to the point where the belt is the furthest away from the edge level. Small width-to-height ratio provides a deep trough, which minimises the surface area of the reaction mixture comprising polymerising material during the polymerisation.

Furthermore, the small width-to-height ratio makes it possible to lengthen the residence time of the reaction mixture in polymerisation reactor while keeping the overall capacity of the reactor at least on the same level as conventional. It has been observed that prolonged residence time for the polymerisation reaction provides improved solubility for the obtained polymer, i.e. less insoluble in the final water-soluble polymer, as well as improved viscosity for the final polymer. The flexible endless belt may be arranged to advance in the longitudinal first direction with a speed in the range of 2-22 m/h, preferably 4-18 m/h, more preferably 5-15 m/h.

Preferably the trough section may have the width-to-height ratio <1.2 for at least 10%, preferably 15%, more preferably 20% of the distance between the first pulley and the second pulley.

The supporting structure includes parts or members that deviate from the horizontal plane and are extending upwards in order to provide support for the trough section. The supporting structure in general may have a U- or V-form, preferably U-form, and the supported flexible belt forms a trough section which form adapts to the form of the supporting structure. According to one embodiment the trough section has a concave base part, wherein the ratio of the concave base part height to the trough section height is in the range of 0.25-0.6, preferably 0.3-0.55, more preferably 0.33-0.5. This means that the supporting structure has a corresponding U-form. The concave base part height is measured from the level, where the distance between the first edge section and the second edge section starts to decrease, to the furthest point of the concave base part.

According to one embodiment of the invention the trough section has a concave base part and a straight main part, wherein the ratio of the concave base part height to the straight main part height is in the range of 0.33-1.23, preferably 0.43-1.23, more preferably 0.48-1.0.

According to one embodiment of the invention the supporting structure comprises a plurality of support roll stations arranged between the first pulley and the second pulley, the support roll stations being arranged at a support distance from each other. Between the support roll stations the flexible belt is essentially unsupported.

The support distance between two succeeding support roll stations may be in the range of 300-700 mm, preferably 350-550 mm. The support distance between the support roll stations is carefully selected so that the flexible belt is firmly supported into trough form even when filled with the reaction mixture comprising polymerising material, as well as to inhibit sagging of the belt between the support roll stations. According to one embodiment the support distance between two succeeding support roll stations is constant in the whole supporting structure. Alternatively, the support distance between the succeeding support roll stations may be shorter in the vicinity of the ends of the polymerisation reactor, e.g. in the vicinity of the first end and the location where the monomer(s) is/are fed into the trough section.

According to one embodiment each support roll station comprises a plurality of individual support rolls arranged after each other. The support rolls are cylindrical, with a first end and a second end, the longitudinal axis of the cylindrical roll extending between the ends. The radius of the support roll may be in the range of 50-200 mm, preferably 100-150 mm. The length of the support roll along the longitudinal axis may be in the range of 100-600 mm, preferably 200-500 mm, more preferably 250-500 mm. In the support roll station the support rolls are arranged after one another in end-to-end manner in desired formation, e.g. U- or V-form, so that they support and are in contact with the first large surface of the flexible belt. When the support rolls rotate around their longitudinal axis, they facilitate the movement of the belt from the first end towards the second end of the polymerisation reactor.

The support rolls in the support roll station are arranged accessible from sides of the arrangement, whereby the individual rolls in a support roll station can be removed and replaced without removal of the flexible belt, which greatly improves the maintenance and reduces process downtime. According to one preferable embodiment of the invention at least two of the succeeding support rolls in a support roll station are identical. Even more preferably the support rolls in the succeeding support roll stations are identical. This means that there is no need to keep in storage a vast variety of different roll sizes, which makes the maintenance of the arrangement technically simple and cheap.

According to one preferable embodiment of the present invention at least a part of the trough section is provided with a cover, which is arranged in connection with the first edge section and the second edge section, and means for providing a nitrogen atmosphere in the covered trough section. The cover can be arranged in connection with the edges or the edge sections of the flexible belt. The cover may comprise, for example guide members, which are arranged in contact with the edges/the edge sections. The guide member may comprise a groove, channel or the like, into which the edge/the edge section can be arranged. The cover is preferably air-tight, and it separates and seals the reaction mixture in the trough section from the surrounding atmosphere. The guide member may comprise seal member for providing leakage-free environment underneath the cover. An atmosphere rich in nitrogen is then arranged under the cover, which inhibits reaction mixture's harmful interaction with oxygen and/or other contaminants present in air. In this manner the quality of the produced polymer is guaranteed.

The arrangement may also comprise one or more temperature sensors that are arranged to detect the surface temperature of the reaction mixture in the trough section. By accurate and real-time temperature monitoring it is possible to detect early if the temperature of the reaction mixture rises too high, which may damage the polymerisation reaction and reduce the quality of the produced polymer. The sensor(s) may be in contact with suitable process control apparatuses.

The arrangement preferably comprises means for feeding at least one monomer and/or monomer mixture in solution form in the trough section of the flexible endless belt at the first end or in vicinity of the first end of the polymerisation reactor. The means for feeding may comprise feeding and metering system for monomer solution(s) and initiator(s). The monomer solution(s) may comprise optional additives, such as process aids, chain transfer agents and stabilizers. The arrangement may also comprise means for removing oxygen from the monomer solution(s) before feeding to the trough section.

According to one embodiment of the present invention the arrangement comprises a vulcanising station for in situ vulcanising of the endless belt.

The arrangement may optionally also comprise irradiation means, which are arranged to direct irradiation, such as UV-irradiation to the reaction mixture for initiating the polymerisation reaction during the travel from the first end of the polymerisation reactor to the second end of the polymerisation reactor.

Furthermore, the arrangement may comprise a first cooling and/or first heating means for monomer solution(s) before they are fed to the trough section. In this manner the monomer solution(s) have the optimal temperature already at the start of the polymerisation reaction, which may improve the progress of the polymerisation reaction. The arrangement may also comprise a second cooling and/or second heating means arranged around the trough section for cooling and/or heating the reaction mixture under its travel from the first end of the polymerisation reactor to the second end of the polymerisation reactor. The heating and/or cooling means may be connected to suitable process control apparatuses and optionally, they can be controlled on basis of the signal obtained from the temperature sensor(s).

The arrangement may further comprise collecting means arranged after the polymerisation reactor for receiving the formed polymer from the endless flexible belt in vicinity of the second pulley, i.e. the second end of the polymerisation reactor. The formed polymer is usually in form of gel, which is of semisolid consistency. The polymer is collected and optionally mechanically comminuted by cutting, shredding and/or grinding.

The arrangement may also comprise drying means, which are arranged to dry the comminuted polymer product. The drying means may be any suitable drying means, such as belt dryer, infrared (IR) dryer or rotary tube dryer. Further the arrangement may also comprise sieving means for classifying the comminuted and dried polymer powder.

Preferably at least one of the monomers in the reaction mixture is acrylate. The arrangement according to the present invention is especially suitable for producing dry copolymers of acrylamide, for example cationic acrylamide, anionic acrylamide, or non-ionic acrylamide, by free radical polymerisation.

Some embodiments of the invention are more closely described in the appended schematical non-limiting drawings, where FIG. 1 shows an embodiment of the invention along the longitudinal axis of the flexible endless belt, along the longitudinal first direction, FIG. 2 shows an arrangement according to one embodiment of the present invention, seen from above, and FIG. 3 shows an arrangement according to one embodiment of the present invention, seen from side.

In FIG. 1 is shown schematically an embodiment of the invention along the longitudinal axis of the flexible endless belt, along the longitudinal first direction.

The flexible endless belt 1 is supported by a support structure 2, which is a support roll station. Support roll station comprises a plurality of support rolls 3, 3' arranged to support the first large surface 1' of the endless belt 1, which is thus formed into a trough section. The support rolls 3, 3' are arranged one after another in U-shape, their surface being in contact with the first large surface 1' of the belt 1. Majority of the support rolls 3 in the support roll station are identical which each other, which reduces the number of different spare parts required.

FIG. 1 shows also the height C of the concave base part, the filling height F for the reaction mixture, the total height of the trough section H as well as trough width W.

A cover 4 is arranged in connection with the first edge section and the second edge section of the belt 1. Guide members 5 are arranged in contact with the cover 4 and the edge section. The guide members 5 comprise seal members 6 for providing leakage-free environment underneath the cover 4.

FIG. 2 shows an arrangement according to one embodiment of the present invention, seen from above. The arrangement 10 comprises a polymerisation reactor in form of a flexible endless belt 1, which is arranged to travel over a first pulley and a second pulley 11' as a flat belt.

The polymer reactor comprises a supporting structure, which is arranged to support the flexible endless belt 1 between the first pulley and the second pulley. The supporting structure comprises a plurality of support roll stations 12, 12', which form the flexible endless belt 1 into a trough section by deviating the first and second edge sections of the flexible endless belt 1 out of the horizontal plane upwards. A trough section having a width-to-height ratio <1.2 is thus formed. The support roll stations 12, 12' are arranged at a suitable support distance from each other.

FIG. 3 shows an arrangement according to one embodiment of the present invention, seen from side. The arrangement 10 comprises a polymerisation reactor in form of a flexible endless belt, which is arranged to travel over the first pulley 11 and a second pulley 11'. The first pulley 11 and the second pulley 11' are arranged at a distance from each other, which distance defines a longitudinal first direction and the travelling direction of the belt 1.

The monomer(s) in form of solution are fed to the endless belt 1 at the first end of the belt, i.e. the first end of the polymerisation reactor. The feeding location of the monomer(s) is indicated in FIG. 3 with an arrow A. The monomers on the endless belt 1 form a reaction mixture, which travels together with the belt 1 towards the second end of the polymerisation reactor, i.e. towards the second pulley 11' while the polymerisation reaction is proceeding. The endless belt is supported by the support roll stations 12, 12' to form a trough section.

In the second end of the polymerisation reactor at the second pulley 11', the polymerised reaction mixture in form of a semisolid polymer gel is transferred from the endless belt to collecting means 13 arranged after the polymerisation reactor.

The arrangement 10 further comprises a vulcanising station 31 for in situ vulcanising of the endless belt 1.

Even if the invention was described with the reference to what at present seems to be the most practical and preferred embodiments, it is appreciated that the invention shall not be limited to the embodiments above, but the invention is intended to cover also different modifications and equivalent technical solutions within the scope of the enclosed claims.

The invention claimed is:

1. An arrangement for continuous production of polymer comprising a polymerisation reactor, said polymerization reactor comprising:
    a first pulley and a second pulley arranged at a distance from each other, which distance, defining a longitudinal first direction,
    a flexible endless belt which is arranged to travel over the first pulley and the second pulley as a flat belt which defines a horizontal imaginary first plane, and which belt, having a first edge section and a second edge section, and
    a supporting structure, which is arranged to support the flexible endless belt between the first pulley and the second pulley, whereby the supporting structure is arranged to form the flexible endless belt into a trough section which is U-shaped by deviating the first edge section and the second edge section of the flexible endless belt away from the longitudinal first direction and out of said horizontal imaginary first plane until the distance between the first edge section and second edge section of the belt deviating from said horizontal imaginary first plane is constant such that said the first edge section and the second edge section are parallel to each other in a direction which is perpendicular to the longitudinal first direction, the trough section having a trough length parallel with the longitudinal first direction, as well as a trough height and a trough width, which are perpendicular with the trough length and with each other,
    wherein said U-shaped trough section has a width-to-height ratio <1.2, for at least 5% of the distance between the first pulley and the second pulley, and further wherein at least a part of the trough section is provided with a cover, which is arranged in connection with the first edge section and the second edge section, and a means for providing a nitrogen atmosphere in the covered trough section.

2. The arrangement according to claim 1, wherein the trough section has a width-to-height ratio in the range of 0.5-1.2.

3. The arrangement according to claim 1, wherein the trough section has the width-to-height ratio <1.2 for at least 10% of the distance between the first pulley and the second pulley.

4. The arrangement according to claim 1, wherein the trough section has a concave base part, wherein the ratio of the concave base part height to the trough section height is in the range of 0.25-0.6.

5. The arrangement according to claim 1, wherein the trough section has a concave base part and a straight main part, wherein the ratio of the concave base part height to the straight main part height is in the range of 0.33-1.23.

6. The arrangement according to claim 1, wherein the supporting structure comprises a plurality of support roll stations arranged between the first pulley and the second pulley, the support roll stations being arranged at a support distance from each other.

7. The arrangement according to claim 6, wherein each support roll station comprises a plurality of individual support rolls arranged after each other.

8. The arrangement according to claim 7, wherein at least two of the succeeding support rolls are identical.

9. The arrangement according to claim 1, wherein the arrangement comprises means for feeding at least one monomer and/or monomer mixture in the trough section of the flexible endless belt in vicinity of the first pulley.

10. The arrangement according to claim 1, wherein the arrangement comprises collecting means arranged after the polymerisation reactor for receiving formed polymer from the endless belt in vicinity of the second pulley.

11. The arrangement according to claim 1, wherein the flexible endless belt is arranged to advance in the longitudinal first direction with a speed in the range of 2-22 m/h.

12. The arrangement according to claim 1, wherein the location of the first pulley and/or the second pulley is configured to be adjustable in the first direction.

13. The arrangement according to claim 1, wherein the width of the first and/or the second edge section is less than 50% of the belt in flat state, the first edge section and the second edge section having an identical width.

14. The arrangement according to claim 1, wherein the trough height as well as the trough width varies gradually along the first longitudinal direction, whereby a maximum trough height and minimum trough width exists between the first pulley and the second pulley.

15. The arrangement according to claim 1, wherein the arrangement comprises cooling and/or heating means arranged around the trough section for cooling and/or heating the reaction mixture, and optionally one or more temperature sensors that are arranged to detect the surface temperature of the reaction mixture.

16. The arrangement according to claim 1, wherein the arrangement comprises a vulcanising station for in situ vulcanising of the endless belt.

* * * * *